(12) United States Patent
Chawla et al.

(10) Patent No.: US 9,893,940 B1
(45) Date of Patent: Feb. 13, 2018

(54) TOPOLOGICALLY AWARE NETWORK DEVICE CONFIGURATION

(71) Applicant: Amazon Technologies, Inc., Seattle, WA (US)

(72) Inventors: Rachit Chawla, Kirkland, WA (US); Mayilan Balachandran, Seattle, WA (US); Jeremy Ryan Volkman, Seattle, WA (US); Christopher John Rose, Seattle, WA (US); Kenneth Oliver Henderson, Jr., Everett, WA (US); Muralidhar Koka, Kirkland, WA (US); Abhoy Bhaktwatsalam, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 253 days.

(21) Appl. No.: 14/721,925

(22) Filed: May 26, 2015

(51) Int. Cl.
| | |
|---|---|
| *G06F 15/177* | (2006.01) |
| *H04L 12/24* | (2006.01) |
| *G06F 17/30* | (2006.01) |
| *H04L 12/911* | (2013.01) |
| *H04L 12/703* | (2013.01) |
| *G06F 9/445* | (2018.01) |

(52) U.S. Cl.
CPC ...... *H04L 41/082* (2013.01); *G06F 17/30914* (2013.01); *H04L 41/0816* (2013.01); *H04L 47/822* (2013.01); *G06F 9/445* (2013.01); *H04L 41/00* (2013.01); *H04L 45/28* (2013.01)

(58) Field of Classification Search
None
See application file for complete search history.

(56) References Cited

U.S. PATENT DOCUMENTS

| | | | | |
|---|---|---|---|---|
| 9,087,028 | B2* | 7/2015 | Osada | G06F 11/2236 |
| 2006/0291659 | A1* | 12/2006 | Watanabe | H04W 12/06 380/270 |
| 2013/0163541 | A1* | 6/2013 | Roh | H04W 72/04 370/329 |
| 2013/0223223 | A1* | 8/2013 | Meloche | H04L 47/31 370/235 |
| 2014/0185429 | A1* | 7/2014 | Takase | H04L 45/28 370/225 |
| 2015/0358198 | A1* | 12/2015 | Mahajan | H04L 41/082 709/221 |
| 2016/0062758 | A1* | 3/2016 | Narayanan | G06F 8/65 717/172 |

* cited by examiner

*Primary Examiner* — Viet Vu
*Assistant Examiner* — James Edwards
(74) *Attorney, Agent, or Firm* — Klarquist Sparkman, LLP

(57) ABSTRACT

The following description is directed to topologically aware network device configuration. In one example, components to be configured within a network can be mapped to one or more redundancy groups within a network topology of the network. The components to be configured can be selectively configured within the network so that network traffic continues during the configuration. Selectively configuring the components can include choosing an order to configure the components based on configuration rules and the mapping of the components to the one or more redundancy groups.

18 Claims, 9 Drawing Sheets

TOPOLOGICALLY AWARE NETWORK DEVICE CONFIGURATION

BACKGROUND

Cloud computing is the use of computing resources (hardware and software) which are available in a remote location and accessible over a network, such as the Internet. In some arrangements, users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Large computer systems, including cloud computing facilities can include many compute resources connected by an internal communications network. The network can include many network components or devices that may need to be upgraded or reconfigured during the operational lifetime of the cloud computing facility. Further, as resources are added to the cloud computing facility, new network components may be added to the network, increasing the size and complexity of the network. The cloud service provider may desire to provide high availability and throughput through the network, even during an upgrade or reconfiguration of the network.

DETAILED DESCRIPTION

Figure 1:
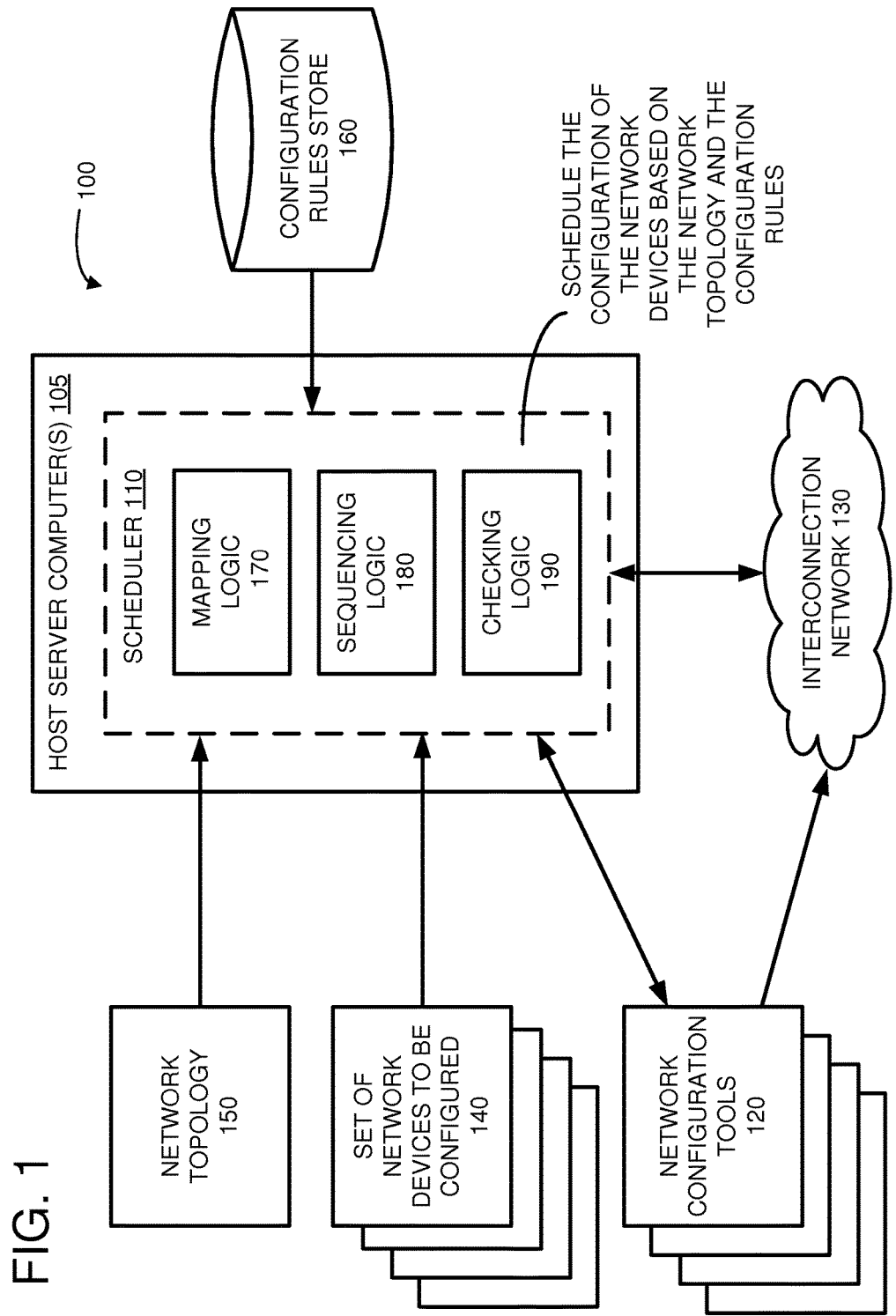
FIG. 1 is a system diagram showing an example of a topologically aware network device configuration system.

The configuration information of a network device is a set of state that describes how the network device operates. For example, the configuration information can include addressing information, routing information, access control lists, access credentials, address translations, quality of service parameters, statistical gathering capabilities, protocol support, timer values, encryption parameters, device-specific tuning parameters, and/or any other information suitable for controlling and/or monitoring how the network device operates. Network devices can include switches (multilayer or single-layer), routers, repeaters, gateways, network bridges, hubs, protocol converters, bridge routers, proxy servers, firewalls, network address translators, multiplexers, network interface controllers, wireless network interface controllers, modems, ISDN terminal adapters, optical transceivers, line drivers, and wireless access points, for example.

When the network device is updated or configured with the configuration information, the network device will operate according to the network device configuration. The configuration information of networking devices can change during the lifetime of the networking devices as users are added, other networking devices are deployed, and new security threats are discovered. Conventional methods for updating the configuration information of a networking device include remotely logging into the network device and making changes to the configuration state of the networking device. Typically, network traffic is stopped for a portion of or for the entire network when the changes are being made to the configuration state of the networking device, resulting in down-time for the network. The changes may be made in response to specific issues or upgrades of the network. Over time, the network device may have been updated many times and by many different network engineers, such that the full configuration state of the network device can only be determined by reading the configuration state off of the network device. If the network device is misconfigured, such as through an operator mistake, the network may experience degraded performance or a network event, such as a severe disruption in service.

As the network grows in size and/or in heterogeneity, it is not scalable for a network engineer to log into each network device and manually make changes to the configuration state of the network device. Ad-hoc automated scripts can be written to perform updates of multiple devices. However, these scripts can cause degraded performance and/or network events if there are dependencies when updating network devices and/or if the script author is unaware of the full configuration state of the network devices. For example, a network event may occur if the script allows one network device to read intermediate configuration state from another network device during its configuration. As another example, the script may overwrite essential configuration state, of which the script author was unaware, with incompatible configuration state. As yet another example, multiple scripts may be running concurrently and the different scripts may be incompatible with each other. As yet another example, ad hoc scripts may not comply with policy rules that are in place to potentially improve maintainability, interoperability, and/or security of the network.

As described herein, network configuration management and deployment tools can potentially provide a more available, secure, scalable, and maintainable network than manual updates or ad-hoc scripting. Fully automated router provisioning, configuration, and deployments can potentially reduce availability and security risks to customers while improving change agility. An automated lifecycle management system for network devices can reduce or eliminate the need for humans (e.g., network engineers) to manually login into network devices and make network changes. Potentially all devices can be provisioned (including programmatic configuration generation, application of the configuration, validation of connections, and safely turning up the device) and managed throughout their lifecycle by automated tools, with little or no human intervention.

An automated continuous deployment pipeline for network devices (e.g., routers) can potentially provide several benefits. An authoritative configuration can be provided potentially any time and on every device. For example, the deployment pipeline can include an authoritative configuration repository with versioned configurations for every network device. By driving all configuration changes through the repository, the repository can be kept in-sync with the actual configuration state of the network devices. For example, configurations can be collected from the network devices and audited against the deployed configurations to determine whether configurations were installed correctly and/or whether any unauthorized changes to the network device have been made.

The deployment system can potentially increase availability of the network to its users. For example, the deployment framework can provide a scheduler to automatically coordinate the configuration of components of the network by selectively configuring the components of the network so that network traffic can continue to flow during the configuration. In particular, the network can be arranged according to a topology including one or more redundancy groups. Respective redundancy groups can include redundant paths for routing traffic between endpoints of the redundancy group. The redundant paths can include one or more components. The configuration of the components within a redundancy group can be scheduled or sequenced so that a first redundant path can continue to carry network traffic while components of a second redundant path are being configured. The coordination of configuration of the components in different redundancy groups can be scheduled and/or sequenced so as to decrease the risk of a network event. Rules for coordinating the configuration of components within and in different redundancy groups can be defined in extensible configuration policy rules so that a network engineer can adapt the rules based on evolution of the network and lessons learned during earlier configurations.

The deployment system can potentially be simple for a user and extensible. For example, the deployment system can provide the ability to push out full configurations or incremental (diff-based) configurations for the network devices. New and existing tools can potentially be integrated into an extensible framework. Customer impact can be reduced or eliminated by using comprehensive safety checks, network policies, and fast rollback. For example, a configuration can be deployed with comprehensive pre-checks and post-checks of the system. The system can integrate with monitoring systems and a metrics dashboard. The system can support automated rollback to a last-known good configuration. The deployment system can potentially reduce the risks of concurrency by including device locking. For example, the deployment framework can provide a scheduler to push configuration changes to devices and allow tools to integrate with the locking service to handle the challenges of concurrency in a multi-tool eco-system. The deployment system can potentially raise visibility through an operationally efficient user interface. For example, the deployment system can potentially provide visibility of all configuration deployments being made to the network at any time, and can potentially allow network engineers to effectively troubleshoot network events and make configuration changes during a high severity event.

The automated continuous deployment pipeline can be used in conjunction with a workflow that includes several stages: (1) new configurations for the network devices can be programmatically generated and stored in an authoritative configuration repository; (2) the different configurations of the devices can be tracked throughout the lifecycle of the device with corresponding versions of configurations in the repository; (3) the different configurations can be verified to comply with policy rules of the network and with expected configurations; (4) configuration changes can be reviewed through a code-review-style approval model; (5) configurations can be validated (e.g., through basic sanity checks and lab testing); and (6) deployments of new configurations to the devices can include pre-checks, post-checks, and rollbacks to a known-good state for multiple classes of configuration changes.

FIG. 1 is a system diagram showing an example of a topologically aware network device configuration system 100. The system 100 can potentially enable the interconnection network 130 to be more highly available to users of the interconnection network 130 during an update or configuration of the interconnection network 130. The interconnection network 130 can include various interconnected components that can communicate with each other and with nodes connected to the interconnection network 130, via packets to exchange data. The components can be architected or arranged according to a network topology 150. The components can be homogeneous or heterogeneous. The components can include logical network devices and physical network devices, where the logical network devices can include other logical network devices and/or physical network devices. For example, physical network devices can include switches (multilayer or single-layer), routers, repeaters, gateways, network bridges, hubs, protocol converters, bridge routers, proxy servers, firewalls, network address translators, multiplexers, network interface controllers, wireless network interface controllers, modems, ISDN terminal adapters, line drivers, and wireless access points. As another example, logical network devices can include switch fabrics, router pairs, or other combinations of physical and/or logical network devices.

The system 100 can include a scheduler 110 executing as a web service on one or more host server computers 105. Web services are commonly used in cloud computing. A web service is a software function provided at a network address over the web or the cloud. Clients or other web services initiate web service requests to servers and servers process the requests and return appropriate responses. The web service requests are typically initiated using, for example, an application programming interface (API) request. For purposes of simplicity, web service requests can be generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request, the web service can generate a response to the request and send the response to the endpoint identified in the request.

The scheduler 110 can coordinate the configuration of the components of the interconnection network 130, where the configuration can be performed by one or more network configuration tools 120. All of the components or a portion of the components can be configured at one time. The components to be configured can be defined or listed in the set of network devices to be configured 140. The components in the set of network devices to be configured 140 can be scheduled to be configured according to the network topology 150 and configuration rules stored in the configuration rules store 160. The network topology 150 is the arrangement of the interconnection network 130 and can include one or more redundancy groups.

A redundancy group can include multiple components and can provide multiple redundant or parallel paths from one set or type of nodes to another set or type of nodes. A respective redundant path of a redundancy group can include multiple components such as one or more network devices and two or more network links. The redundant paths of the redundancy groups can be used to provide different paths for load balancing and/or failover capabilities. For example, a first redundant path can include a first router and a first pair of network links for routing packets between node A and node B. A second redundant path can include a second router and a second pair of network links for routing packets between node A and node B. Thus, the first and second redundant paths can provide a pair of parallel paths within a redundancy group between a common set of nodes (A and B).

Redundant paths of a redundancy group can be used for load balancing or aggregation of packets between one set of nodes and another set of nodes. For example, the first and second redundant paths can be used for load balancing or aggregation when multiple packets are routed from node A to node B across both redundant paths at the same time. To balance the load through the redundant paths, a particular packet's path may be selected based on the traffic flow through the redundancy group. For example, the particular packet may be routed via a more lightly loaded redundant path (e.g., the first redundant path) rather than a more heavily loaded redundant path (e.g., the second redundant path). As the loading changes, new packets may be routed via the second redundant path if it becomes the more lightly loaded redundant path. By dynamically balancing the load, potentially more network traffic can be sent through the redundancy group as compared to statically routing packets through only one of the redundant paths.

The first and second redundant paths can be used for failover. For example, a packet can be assigned a primary path (e.g., through a first redundant path) and a secondary path (e.g., through a second redundant path) to get from node A to node B. The packet can be delivered through the primary path when the primary path is available for sending packets. However, the packet can be delivered through the secondary path when the primary path is degraded, has failed, or is off-line for maintenance. By providing multiple alternative paths, a packet is more likely to reach its destination even if portions of the network are degraded or non-operational.

A redundant path can include a single network device or can include multiple network devices. Redundancy groups and redundant paths can include homogeneous or heterogeneous elements. For example, a redundancy group can include switches, routers, repeaters, optical transceivers, high-radix networks, other suitable network devices, and/or combinations thereof. A high-radix network can include Clos, folded-Clos, fat-tree, butterfly, flattened-butterfly, torus, chordal ring, fully-interconnected, dragonfly networks, and other suitable networks that may combine elements of the aforementioned networks, for example. A redundancy group can be associated with one or more layers of the Open Systems Interconnection (OSI) model. For example, a redundancy group can include only layer 2 (the data link layer) components, only layer 3 (the network layer) components, or both layer 2 and layer 3 components.

Redundancy groups can have different types and can be hierarchical. For example, different types of redundancy groups can be defined to overlay different respective portions of a network topology. As a specific example, the network can be organized into multiple geographical regions, where each region can include one or more availability zones and/or datacenters. The resources of an availability zone can be isolated or insulated from the resources of other availability zones such that a failure in one availability zone is unlikely to result in a failure in any other availability zone. The availability zones can be connected to each other via redundant core routers. Racks of resources within each availability zone can be connected to the core routers via redundant aggregating networks (which can include redundant sub-modules or sub-networks). The resources within a rack can be connected to the aggregating networks via one or more redundant routers or switches associated with the rack. Thus, a redundancy group can include an availability zone or datacenter, a core routing network (such as router pairs or groups), an aggregating network (such as a high-radix network), a sub-module of an aggregating network (such as a tier of a high-radix network), and a rack-mounted switch pair, for example.

Using typical methods, the interconnection network 130 can be updated or configured when the interconnection network 130 is taken off-line for maintenance, resulting in down-time or unavailability to a user or customer of the interconnection network 130. In contrast, the scheduler 110 can enable the interconnection network 130 to be configured so that network traffic is capable of flowing through the network during the configuration of the components of the interconnection network 130. Thus, the scheduler 110 can potentially enable the interconnection network 130 to be more highly available to users of the interconnection network 130. Generally, the scheduler 110 can keep network traffic flowing by selectively configuring the components of the interconnection network 130. For example, the configuration of the components within a redundancy group can be scheduled or sequenced so that a first redundant path can continue to carry network traffic while components of a second redundant path are being configured.

The scheduler 110 can include mapping logic 170, sequencing logic 180, and checking logic 190. The mapping logic 170 can map the set of network devices to be configured 140 to corresponding redundancy groups and/or redundant paths of the network topology 150. The network topology 150 can include an inventory and connectivity of the components of the interconnection network 130 and can categorize the different components into respective redundancy groups and redundant paths. The network topology 150 can include additional information about the components of the interconnection network 130 such as a device type, deployment date, last configuration update, maintenance history, or other suitable information related to the identification, operation, and/or maintenance of components of the interconnection network 130. Mapping a respective network device of the set of network devices to be configured 140 can include performing a search within the network topology 150 to identify which of the redundancy groups and/or redundant paths are associated with the respective network device. The network topology 150 can be manually specified by a network engineer or can be automatically generated by a specialized service or the scheduler 110.

The set of network devices to be configured 140 can be generated at various times by various sources. For example, a network engineer can manually define network devices in the set of network devices to be configured 140. As another example, the set of network devices to be configured 140 can be automatically generated by tools of a network device configuration deployment pipeline. As a specific example, a first tool can generate a first set of devices to be added to the set of network devices to be configured 140 and a second tool, at a later time, can generate a second set of devices to be added to the set of network devices to be configured 140.

The set of network devices to be configured 140 can specify specific physical devices, logical devices, or a device type for the components to be configured. For example, a specific physical device can be identified by an Internet Protocol (IP) address, a Media Access Control (MAC) address, a serial number, a physical location, or another identifier. As another example, multiple devices can be identified using a specified device type, such as a vendor identifier and model number. As another example, a logical device can be used to identify one or more devices, where the logical device can include the one or more devices. The mapping logic 170 can include logic to identify specific physical devices corresponding to a logical device or a device type, such as by performing a search within the network topology 150 to identify all of the physical devices corresponding to the logical device or device type. Thus, the mapping logic 170 can generate information identifying each of the physical devices to be configured and their corresponding redundancy groups and/or redundant paths.

The set of network devices to be configured 140 can include categories or types of operations to be performed during the configuration of the respective network devices. Some types of configuration operations may occur while the component being configured is operational (e.g., network traffic can flow through the component during configuration). However, other types of configuration operations may result in undesirable effects (such as lost or misrouted packets) if network traffic is flowing through the component during configuration. The mapping logic 170 can generate information for identifying whether to reroute traffic during configuration of each of the physical devices to be configured. Different categories or types of operations can be performed by different network configuration tools 120. The mapping logic 170 can generate information for identifying which of the network configuration tools 120 to use during configuration of each of the physical devices to be configured.

The sequencing logic 180 can use the information generated by the mapping logic 170 and the configuration rules to create a schedule to configure the components of the interconnection network 130. The schedule can be generated so that network traffic is capable of flowing through the interconnection network 130 while it is being configured. For example, respective redundancy groups can include multiple redundant paths for routing traffic between endpoints of the redundancy group. The configuration of the components can be scheduled or sequenced so that a first redundant path can continue to carry network traffic while components of a second redundant path are being configured. In particular, network traffic can initially flow through both redundant paths of the redundancy group. Traffic can be shifted from the second redundant path so that the first redundant path carries all of the traffic prior to the configuration of components of the second redundant path. After configuration of the second redundant path, all traffic can be shifted to the second redundant path so that the components of the first redundant path can be configured. After configuration of the first redundant path, traffic can be returned to the original state where traffic can flow through both redundant paths of the redundancy group.

The configuration rules can be used to implement contractual promises between business entities (such as a cloud service provider and its customers) and to implement engineering constraints and/or policies to potentially reduce customer impact during configuration of the interconnection network 130. For example, the configuration rules can include rules defining a window of time (such as when most users of the network are idle) or network conditions to be met before the interconnection network 130 can be configured. As another example, the configuration rules can include rules for sequencing the configuration of components within a redundancy group and in different redundancy groups. Examples of configuration rules for sequencing the configuration of components in different redundancy groups can include: defining whether and which redundancy groups can be configured concurrently, and defining that one redundancy group is configured before another redundancy group. As a specific example, the cloud service provider can be contractually bound to only make configuration changes to one availability zone at a time. Thus, a configuration rule can define that configuration changes can only occur in redundancy groups associated with a single availability zone at one time. Examples of configuration rules for sequencing the configuration of components within a redundancy group can include: defining a maximum number or percentage of components that can be configured at one time within a redundancy group, defining an order to configure the components within the redundancy group, and defining a traffic utilization threshold that cannot be exceeded before configuring a component.

The configuration rules can be stored in the configuration rules store 160. The configuration rules store 160 can include magnetic disks, direct-attached storage, network-attached storage (NAS), storage area networks (SAN), redundant arrays of independent disks (RAID), magnetic tapes or cassettes, DVDs, or any other medium which can be used to store information in a non-transitory way and which can be accessed by the scheduler 110.

The sequencing logic 180 can combine and/or defer incoming requests (here, a request refers to receiving a new or updated set of network devices to be configured 140) to update the components of the interconnection network 130. As described above, the set of network devices to be configured 140 can be generated at various times and by various sources. Efficiencies may be gained by combining requests arriving at different times. For example, requests may be combined when the network configuration tools 120 are inactive, such as when the requests arrive outside of a window of time to configure the components of the interconnection network 130. However, requests arriving while the components of the interconnection network 130 are being configured may be deferred until the next window of time to configure the components.

The sequencing logic 180 can initiate and track the progress and state of the configuration of the different components of the interconnection network 130. For example, the sequencing logic 180 can cause the network configuration tools 120 to configure one or more of the components of the interconnection network 130 according to the schedule generated by the sequencing logic 180. Thus, the sequencing logic 180 can coordinate a configuration of the set of network devices to be configured 140 according to the configuration rules so that traffic is capable of flowing through the network during the configuration.

The network configuration tools 120 can be used to update the components of the interconnection network 130 according to a desired or released configuration, where the released configuration is a configuration that is ready to apply to the component. The network configuration tools 120 can be used to update all of the state associated with the released configuration or a portion of the state associated with the released configuration. For example, the configuration tools 120 can include different tools for updating credentials, updating access control lists (ACLs), and updating routing tables. The network configuration tools 120 can include pre-checks, post-checks, and roll-backs. For example, pre-checks can include obtaining a lock for a component, reading or collecting the current configuration state of the component to be updated, comparing the current configuration state to a deployed configuration state (where the deployed configuration represents the configuration state of the component when it is updated), checking the released configuration against a set of rules or policies, quiescing traffic and/or processes on the component, and aborting the update if any of the pre-checks fail. The pre-checks can be performed before the released configuration state is pushed to the component. The post-checks can be performed after the released configuration state is pushed to the component. The post-checks can include reading or collecting the current configuration state of the component that was updated, comparing the collected configuration state to the released configuration state, enabling traffic and/or processes on the component, releasing the lock on the component, and initiating a roll-back if any of the post-checks fail. The roll-back can be used to push the last-known-good configuration to the component if the post-checks fail.

The sequencing logic 180 can track the progress of the configuration by communicating with the network configuration tools 120. For example, the network configuration tools 120 can send a message to the scheduler 110 indicating that a component of the interconnection network 130 has been configured. The state of the configuration of a component can be tracked by analyzing completion messages from the network configuration tools 120 to determine if the component was properly configured.

In addition to or as an alternative to using the checking logic of the network configuration tools 120, the checking logic 190 can perform checks to determine if the component was properly configured. For example, the checking logic 190 can include: comparing the released configuration to the deployed configuration of the component; measuring traffic on the configured components and determining if one or more measures of the traffic (such as bandwidth utilization) are within a predefined range; checking for error conditions identified and stored within the configuration state of the component; and verifying neighborship or connectivity before and after the component is configured. For example, a network device's neighbor can be a network device connected on a common subnet and sharing a set of common configuration information, such as an area identifier, an area type, a subnet mask, and authentication parameters. Neighbors can communicate with each other.

The sequencing logic 180 can communicate with the checking logic 190 and can abort or stop configuration of subsequent components when the checking logic 190 indicates that an earlier configured component was not configured properly. For example, the checking logic 190 can check whether a configuration of a network device of a first redundant path of a particular redundancy group is validly configured. If the first redundant path is validly configured, the sequencing logic 180 can cause a second redundant path of the particular redundancy group to be configured. However, if the first redundant path is not validly configured, the sequencing logic 180 can abort configuring of the second redundant path of the particular redundancy group. After a configuration failure is discovered, the sequencing logic 180 can stop only the configuration of the current redundancy group or it can stop the configuration of all subsequently scheduled redundancy groups. For example, a configuration rule can be used to determine whether the abort can be effective only within the redundancy group where the error was detected or whether the abort can be effective for all subsequently scheduled redundancy groups.

The checking logic 190, the sequencing logic 180, and/or the network configuration tools 120 can log an error or generate an alert in response to an error being detected by one of the checks of the configurations.

Figure 2:
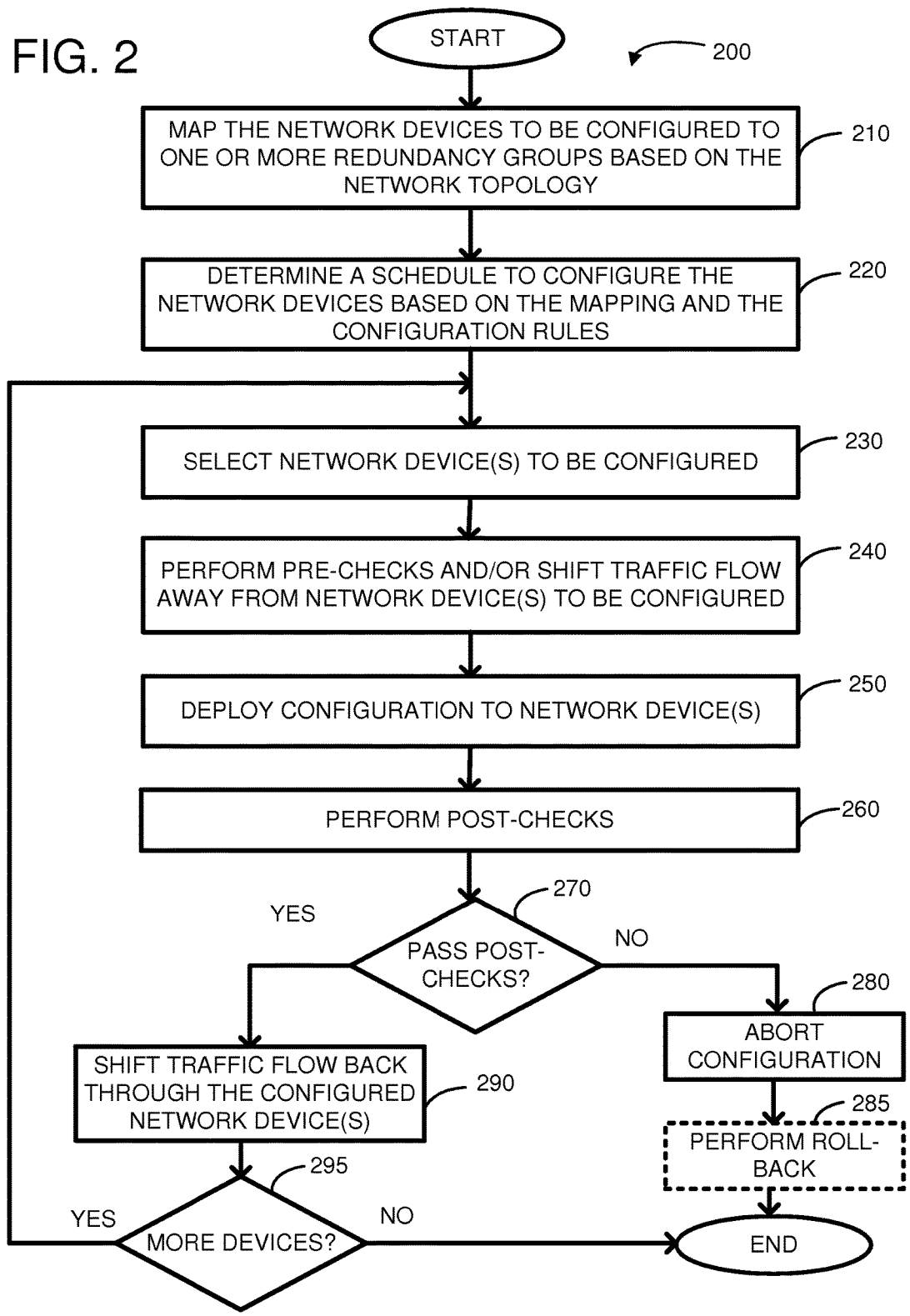
FIG. 2 is a flow diagram of an example method for configuring devices of a network according to configuration rules and a network topology.

FIG. 2 is a flow diagram of an example method 200 for configuring devices of a network (such as the interconnection network 130) according to configuration rules and a network topology. At 210, the network devices to be configured can be mapped to one or more redundancy groups based on the network topology. The network devices to be configured can be specified as individual physical network devices, as logical network devices, and/or by device type. The mapping information can include a set or list of network devices to be configured and one or more details affecting the configuration of respective network devices, such as: a redundant path and redundancy group, a reference to a released configuration, a flag indicating whether traffic is to be rerouted during configuration, and a configuration tool to use during the configuration.

The network devices to be configured can be specified by multiple tools of a network device deployment suite and/or by multiple network engineers. The network devices to be configured can be provided at different times and so the mapping can be updated incrementally based on when new network devices to be configured are presented. The mapping can be locked for a period of time, such as when the network devices are currently being configured. When network devices to be configured are presented while the mapping is locked, the network devices can be mapped after the locking period ends.

At 220, a schedule to configure the network devices can be determined based on the mapping and configuration rules. The configuration rules can include various constraints to potentially reduce customer impact during configuration of the network devices. For example, the configuration rules can include rules defining a window of time in which to configure the network devices and rules for sequencing the configuration of components within a redundancy group and in different redundancy groups.

Scheduling may include parallelizing the configuration of some of the network devices where the configuration rules allow. For example, network devices in different redundancy groups can be configured in parallel. As another example, one or more redundant paths of a redundancy group can be configured in parallel where another redundant path of the redundancy group is able to carry traffic during the configuration. As yet another example, the configuration of the network devices can be parallelized where traffic can continue to flow through the network devices during the configuration. By parallelizing the configuration of the network devices, the time to configure all of the network devices can be reduced as compared to configuring each network device one at a time.

Scheduling may include serializing the configuration of some of the network devices to keep traffic flowing or to comply with the configuration rules. For example, a first redundant path of a pair of redundant paths of a redundancy group can be configured before the second redundant path of the pair so that traffic can flow through the second redundant path while the first redundant path is being configured. As another example, configuration of a redundancy group corresponding to an availability zone can be serialized with a different redundancy group corresponding to a different availability zone so that neither of the availability zones are configured at the same time. By serializing the configuration of some of the network devices, errors in a configuration can potentially be caught early and isolated so that the availability and robustness of the network can potentially be increased.

Scheduling may include providing a slow start when configuring the devices of the network. For example, the number of network devices to configure in parallel can be ramped up depending on how many devices have been configured earlier in the schedule. In particular, a slow start can include configuring fewer devices in parallel earlier in the schedule and configuring more devices in parallel later in the schedule. As a specific example, a slow start can include configuring one, then two, then four, then eight devices in parallel until all of the devices are configured. In this manner, the network device configuration can be tested in a relatively small number of devices before applying the network device configuration to a larger number of devices.

The extensible configuration rules can be fine-tuned so that the generated schedule can trade off serial and parallel configuration to meet speed of configuration and availability goals of the network. Thus, the schedule can include portions of the schedule that are dependent on earlier portions of the schedule completing, and the schedule can include portions where multiple jobs can be performed independently of the other jobs executing in parallel. In particular, the schedule can include an ordering for completing the configuration of the network devices. In one embodiment, the schedule can be represented by a directed acyclic graph where each vertex represents the network devices that can be configured in parallel and all of which will complete before beginning configuration of the network devices pointed at by edges leading away from the current vertex.

At 230, one or more network devices can be selected to be configured. The one or more network devices can be selected based on the schedule. For example, the selected network devices can be the network devices that can be configured in parallel. As a specific example, network devices in sibling redundancy groups of an availability zone can potentially be configured in parallel. Where a respective redundancy group includes a pair of redundant paths, the network devices of one redundant path can be selected and the network devices of the other redundant path can be deferred until after the network devices of the selected redundant path are finished being configured. Where a respective redundancy group includes more than two redundant paths, the network devices of multiple redundant paths can be selected so long as the configuration of the network devices of at least one redundant path is deferred until after the network devices of the selected redundant paths are finished being configured.

The number of redundant paths to configure in parallel can be based on a maximum bandwidth reduction through the redundancy group. For example, if the network devices of two redundant paths are selected to be configured from a redundancy group having four redundant paths, then the maximum bandwidth through the redundancy group can be reduced by 50% during the configuration. Alternatively, if only one redundant path is configured from the redundancy group at one time, then the maximum bandwidth through the redundancy group is only reduced by 25%. The configuration rules can be used to set the maximum bandwidth reduction for a redundancy group, such as by defining a maximum percentage reduction, a maximum number of redundant paths to configure in parallel, or other suitable criteria. By keeping at least one redundant path operational during the configuration of other redundant paths, traffic can continue to flow through a redundancy group.

At 240, pre-checks can be performed and/or traffic can be shifted away from the network devices to be configured. Pre-checks can include obtaining a lock to configure the network device, reading or collecting the current configuration state of the network device to be updated, comparing the current configuration state to a deployed configuration state, and checking the released configuration against a set of rules or policies. If the pre-checks fail, an informational message can be logged or an alert can be generated. The message or alert can be used by a network engineer to diagnose potential problems with the network device or unauthorized changes to the network device, for example. Additionally or alternatively, if the pre-checks fail, configuration of the failing and/or all of the selected network devices can be aborted.

The network traffic can be routed away from the network devices to be configured. Routing traffic away from the network devices to be configured can include disabling one or more links of the network devices to be configured, increasing the cost for a neighboring network device to route traffic through the network device to be configured, enabling or disabling a fail-over mode for the redundancy group with the network device to be configured, or other suitable actions for re-routing traffic. Network traffic can be routed away from the network devices to be configured so that the traffic is not corrupted, misrouted, or dropped during the configuration. For example, it may be desirable to reroute traffic through a redundant path if the network device is rebooted during configuration, or if routing tables and/or other routing state is updated during the configuration. Alternatively, some configuration changes may not involve a reboot or changes to the routing state of the network device. In this case, traffic may continue to flow the network device being configured. When traffic is rerouted, it may be desirable to wait for a period of time and/or to query the buffer state of the network device to confirm that outgoing packets of the network device have been transmitted and that the traffic through the network device has quiesced.

At 250, the configuration can be deployed to the network device. For example, released configuration state can be transmitted and applied to the network device. For example, a new operating system or software can be installed, software patches can be applied, routing or access tables can be updated, and/or other state of the network device can be updated. As described above, the deployment can occur to multiple network devices in parallel.

At 260, post-checks can be performed on the network devices that were configured (at 250). The post-checks can be used to diagnose whether the configuration of the network devices were successful. The post-checks can include reading or collecting the current configuration state of the network devices that were configured, comparing the collected configuration state to the released configuration state, determining if a measurement of traffic through the configured network devices is within a predefined range, checking for error conditions identified and stored within the configuration state of the network devices, and verifying neighborship or connectivity of the network devices. The post-checks can act as a serialization checkpoint for the network devices being configured. For example, the post-checks can be used to wait for all of the network devices selected at 230 to be configured before enabling more network devices to be selected for configuration.

At 270, it is determined whether the post-checks passed for at least some of the network devices configured at 250. As one example, the post-checks can pass only when post-checks pass for all of the network devices selected at 230. As another example, the post-checks can pass when post-checks pass for a majority or all but a few of the network devices selected at 230. The configuration rules can be used to set a threshold number or percentage of network devices that can fail during post-checks. If the post-checks are unsuccessful, indicating that an error occurred during the configuration, the method 200 can be aborted at 280. The configuration can be aborted for all network devices remaining to be configured in the schedule, or for only the network devices remaining to be configured in the redundancy group of the failing network device. At 285, the configuration state of the network devices can be rolled back to a last-known-good configuration. If the post-checks are successful, the method 200 can continue at 290.

At 290, network traffic can be re-enabled or shifted back through the configured network devices passing the post-check tests. Routing traffic back through the configured network devices can include enabling one or more links of the configured network devices, decreasing the cost for a neighboring network device to route traffic through the configured network device, enabling or disabling a fail-over mode for the redundancy group with the configured network device, or other suitable actions for re-routing traffic. Additional post-check tests may be used to confirm that traffic is flowing as expected through the newly configured network devices. If the additional post-check tests fail, an alert can be generated, a message can be logged, and/or an abort of the configuration can occur.

At 295, it can be determined if more devices remain to be configured in the schedule. If more devices remain, the method 200 can loop back to 230, where more network devices can be selected to be configured. For example, after configuring the network devices of a first redundant path of a redundant-path pair, the network devices of a second redundant path can be configured. When no more devices remain to be configured, the method 200 can end.

Figure 3:
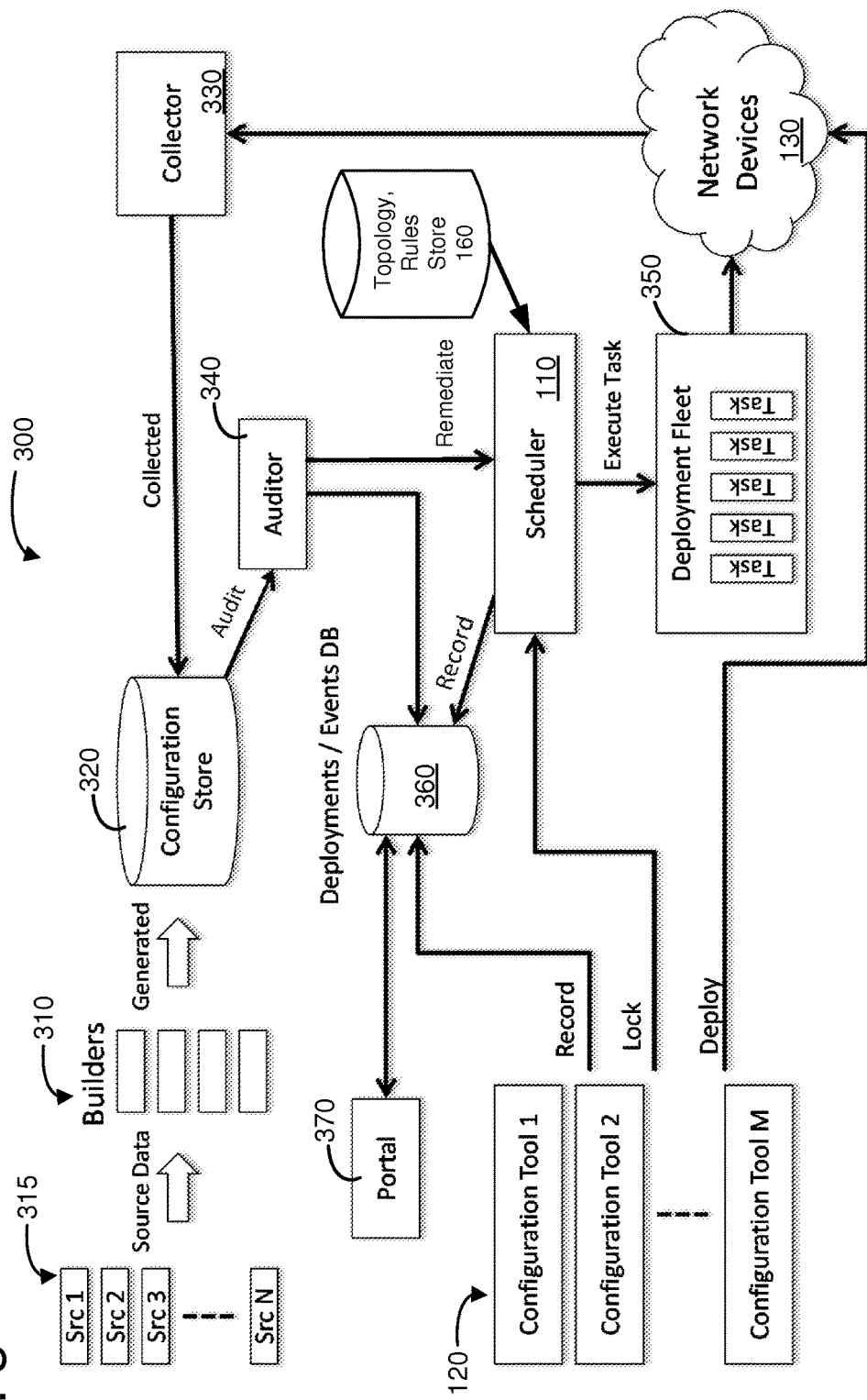
FIG. 3 is a system diagram showing an example of a network device configuration deployment pipeline capable of performing topologically aware network device configuration.

The system 100 for performing a topologically aware network device configuration can communicate with or be a part of a network device configuration deployment pipeline that can be used to maintain, install, and audit network device configurations on network devices within a network. FIG. 3 illustrates a system diagram showing an example of a network device configuration deployment pipeline 300 capable of performing a topologically aware network device configuration.

The deployment pipeline 300 can include programmatic configuration generation systems (e.g., builders 310) for generating a complete configuration for a network device from a subset of configuration information for the network device. The subset of configuration information can be stored in data sources 315. The data sources 315 can include one or more repositories for holding one or more types of configuration data, such as a credential repository for maintaining credentials, an ACL repository, and other repositories suitable for storing network device configuration data. The data sources 315 can be used as input to the builders 310. Additionally or alternatively, configuration state from the configuration store 320 can be used as input to the builders 310. The builders 310 can perform checks on the configuration state inputs and generate a complete network device configuration from the inputs to the builders 310. The checks can include verifying that the configuration state inputs comply with polices and rules of the network. As one example, the builders 310 can create a complete configuration when an ACL repository of data sources 315 is updated. The builders 310 can generate the complete configuration by combining the non-ACL configuration state of the released configuration with the ACL configuration information from data sources 315, for example. The configuration generated by the builders 310 can be used to program one or more of the network devices 130.

The generated configuration can be communicated from the builders 310 to the configuration store 320 where the generated configuration can be stored. The configuration store 320 can include multiple versioned configurations for the network devices 130 including a generated configuration, a deployed configuration, a collected configuration, a released configuration, and a last-known-good configuration. Each of the network devices 130 can have the same or different generated configurations. The generated configuration can be stored as the released configuration. Alternatively, the generated configuration can be stored in the configuration store 320 and reviewed by one or more network engineers and/or software tools prior to being stored as the released configuration. For example, one or more network engineers may perform a visual inspection (e.g., code review) and/or perform experiments with the generated configuration prior to releasing the generated configuration. As another example, software tools may perform checks on the generated configuration to determine whether the generated configuration complies with one or more policies or rules. If the generated configuration is approved as having passed the automated and/or manual checks, the generated configuration can be released. The configuration data can be stored in association with metadata about the configuration, such as a status, a version number, one or more time-stamps, a latest author, an approving manager, and/or a description of the configuration data, for example.

The released configuration can be an authoritative next-provisioned state of the network devices 130. In particular, the released configuration is a configuration that is ready to apply to the network devices 130 (such as after the configuration has been approved), but may not have been applied yet. Thus, the released configuration can represent a trusted and accurate representation of what the configuration state of the network devices 130 should be after the network devices 130 have been updated with the released configuration. Thus, the released configuration can differ from the current configuration state of the network devices 130 in the time between when a new released configuration is stored and before the network devices 130 are updated. Each of the network devices 130 can have the same or a different released configuration.

The collector service 330 can be used to collect configuration state from the network devices 130. The collected configuration can represent the configuration state of the network devices 130 at the time of collection. At the time of collection, the collected configuration can represent the current-provisioned state of the network devices 130. The collector service 330 can be called by other services of the deployment pipeline 300 via an application programming interface (API). For example, the collector service 330 can be called by the configuration tools 120 to collect the deployed configuration of one or more network devices 130 as one step of the update process. The configuration state of the network devices 130 can be monitored and collected at different times and stored in multiple locations or with multiple labels. The most recently collected configuration state of the network devices 130 can be stored as the collected configuration. When the network devices 130 are being updated, the configuration state of the network devices 130 can be collected and stored as the deployed configuration and the collected configuration. Thus, the deployed configuration can represent the configuration state of the network devices 130 when they are updated. When the network devices 130 are updated, the deployed configuration and the collected configuration can be the same. However, over time, the deployed configuration and the collected configuration may diverge, such as when manual changes are made to the configuration state of the network devices 130. The collected configuration and the deployed configuration can include separate stored state for each of the network devices 130. As an alternative to collecting the deployed configuration, the released configuration can be copied to the deployed configuration.

The auditor service 340 can monitor the configuration store 320 and determine if there is a semantic difference between the released configuration and the collected configuration or the deployed configuration. The deployed configuration can be collected by the collector service 330 when the network devices 130 are updated, or the deployed configuration can be copied from the released configuration when the network devices 130 are updated. If the auditor service 340 detects a difference, the auditor service 340 can cause the difference to be remediated by causing an update of the network device to be scheduled via the scheduler service 110. The auditor service 340 can identify the particular devices of the network devices 130 where a difference is present. The auditor service 340 can generate a set of network devices to be configured.

The scheduler service 110 can schedule the update based on a topology of the network devices 130 and one or more policies, rules, events, or other suitable criteria stored in the topology and rules store 160. The scheduler service 110 can determine a time or event to begin updating the network devices 130. For example, the network devices 130 can be updated at a given time or based on an event-trigger. For example, an update for a particular one of the network devices 130 can be scheduled to occur as soon as possible. As another example, an update for a particular one of the network devices 130 can be scheduled for a specific time when the network is typically not busy. As another example, an update for a particular one of the network devices 130 can be scheduled based on measured performance criteria being satisfied, such as when the average bandwidth through a network device is less than a threshold.

The scheduler service 110 can determine an order in which to update the network devices 130. The order can be determined based on how the set of network devices to be configured overlay or map to the network topology. For example, the scheduler service 110 can map the set of network devices to be configured into one or more redundancy groups within the network topology. The order can be determined based on the configuration rules. For example, the configuration rules can define that some of the network devices (e.g., those in different redundancy groups) can be updated in parallel with each other and others of the network devices can be scheduled to follow an update of a different one of the network devices 130 (e.g., those in different redundant paths of the same redundancy group). As a specific example, devices of a first redundant path of a pair of redundant paths of a redundancy group can be configured before devices of the second redundant path of the pair so that traffic can flow through the second redundant path while the first redundant path is being configured. After the devices of the first redundant path are updated, the devices of the second redundant path can be configured while traffic flows through the devices of the first redundant path.

The scheduler service 110 can monitor the scheduling criteria and can initiate an update of the network devices 130 when the scheduling criteria is met. The scheduler service 110 can initiate an update of the network devices 130 by executing one or more of the configuration tools 120 and/or a task of a deployment fleet 350. The scheduler service 110 can manage or coordinate multiple concurrent updates to the network devices 130 using one or more locks. By utilizing the locks, the scheduler service 110 can reduce the likelihood of introducing a race condition during the deployment of the network device configurations that could potentially cause degraded performance of the network. The locks can also reduce the likelihood of configuration changes made by one tool or a human from being overwritten by another tool or human. The locks can be associated with one or more of the network devices 130 and/or one or more of the configuration tools 120. For example, updating a first network device using a first tool may be conditioned on obtaining a lock associated with the first network device and another lock associated with the first tool. In one embodiment, initiating an update of one or more of the network devices 130 can be conditional on obtaining one or more of the locks. In an alternative embodiment, an update of one or more of the network devices 130 can be initiated without obtaining one or more of the locks, but one or more steps of the update can be conditional on obtaining one or more of the locks. In other words, some parts of the update can occur without the lock and other parts of the update may need a lock to be performed.

The configuration tools 120 and/or tasks of the deployment fleet 350 can be used to update the network devices 130 according to the released configuration, such as by transmitting the released configuration to the network devices 130 and installing or executing the released configuration. Updating the network devices 130 can include requesting one or more locks from the scheduler service 110 prior to or during updating the network devices 130, as described above. Updating the network devices 130 can include updating all of the state associated with the released configuration (a full configuration) or a portion of the state associated with the released configuration (an incremental configuration). For example, the configuration tools 120 and/or tasks of the deployment fleet 350 can include different tools for updating credentials, updating access control lists (ACLs), updating routing tables, and updating other configuration state of the network device.

The choice between performing a full or an incremental configuration can be determined by analyzing the differences between the released configuration and the deployed configuration. For minor differences, such as where differences are detected in only one or a few sections of the configuration, performing an incremental configuration may potentially reduce the time, risk, and/or resources for performing the incremental configuration. The partial configuration can update the configuration state of the network device that corresponds to differences between the released configuration and the deployed configuration. Thus, after a partial configuration is complete, the released configuration and the deployed configuration can be the same, just as if a full configuration were performed. A full configuration can be performed when differences are found in more than a threshold number of sections.

The configuration tools 120 and deployment fleet 350 can perform pre-checks, post-checks, and roll-back. Additionally or alternatively, the scheduler service 110 can perform pre-checks, post-checks, and roll-back. For example, pre-checks can include obtaining one or more of the locks, reading or collecting the current configuration state of the network devices 130 to be updated, comparing the current configuration state to the deployed configuration state, checking the released configuration against a set of rules or policies, quiescing traffic and/or processes on the network devices 130, and aborting the update if any of the pre-checks fail. The pre-checks can be performed before the released configuration state is pushed to the network devices 130. The post-checks can be performed after the released configuration state is pushed to the network devices 130. The post-checks can include reading or collecting the current configuration state of the network devices 130 that were updated, comparing the collected configuration state to the released configuration state, enabling traffic and/or processes on the network devices 130, releasing one or more of the locks, and initiating a roll-back if any of the post-checks fail. The roll-back can be used to push the last-known-good configuration to the network devices 130 if the post-checks fail.

After installation, the configuration tools 120 and deployment fleet 350 can call the collector service 330 to collect the deployed configuration. Alternatively, a different service (not shown) can download or read the current configuration state from the network devices 130 when the network devices 130 are updated. The configuration tools 120, deployment fleet 350, and/or scheduler service 110 can record a log of activity on a deployments/events database 360 and release the one or more locks after the deployed configuration has been collected and the deployment log has been recorded on the deployments/events database 360.

The deployments/events database 360 can be used to store various information about activities and events occurring within the deployment pipeline 300. For example, the deployments/events database 360 can be used to store the version of configuration information pushed to the network devices 130 and the time when the network devices 130 are updated. Thus, an audit trail can be created to provide network engineers with data to effectively troubleshoot network events and make configuration changes during a high severity event. For example, a portal 370 can provide a user interface for accessing the deployments/events database 360, data sources 315, and configuration store 320. The portal 370 can provide access to raw data recorded on the databases. The portal 370 can present notifications and alerts of events occurring in the network 130 and/or the deployment pipeline 300. For example, the scheduler 110 can record when an update is initiated and the portal can show an alert that the update has started. As another example, the portal can show an alert to indicate when an audit of the network device configurations fails.

The deployments/events database 360, data sources 315, topology and rules store 160, and configuration store 320 can include magnetic disks, direct-attached storage, network-attached storage (NAS), storage area networks (SAN), redundant arrays of independent disks (RAID), magnetic tapes or cassettes, DVDs, or any other medium which can be used to store information in a non-transitory way and which can be accessed by one or more services of the deployment pipeline 300.

Figure 4:
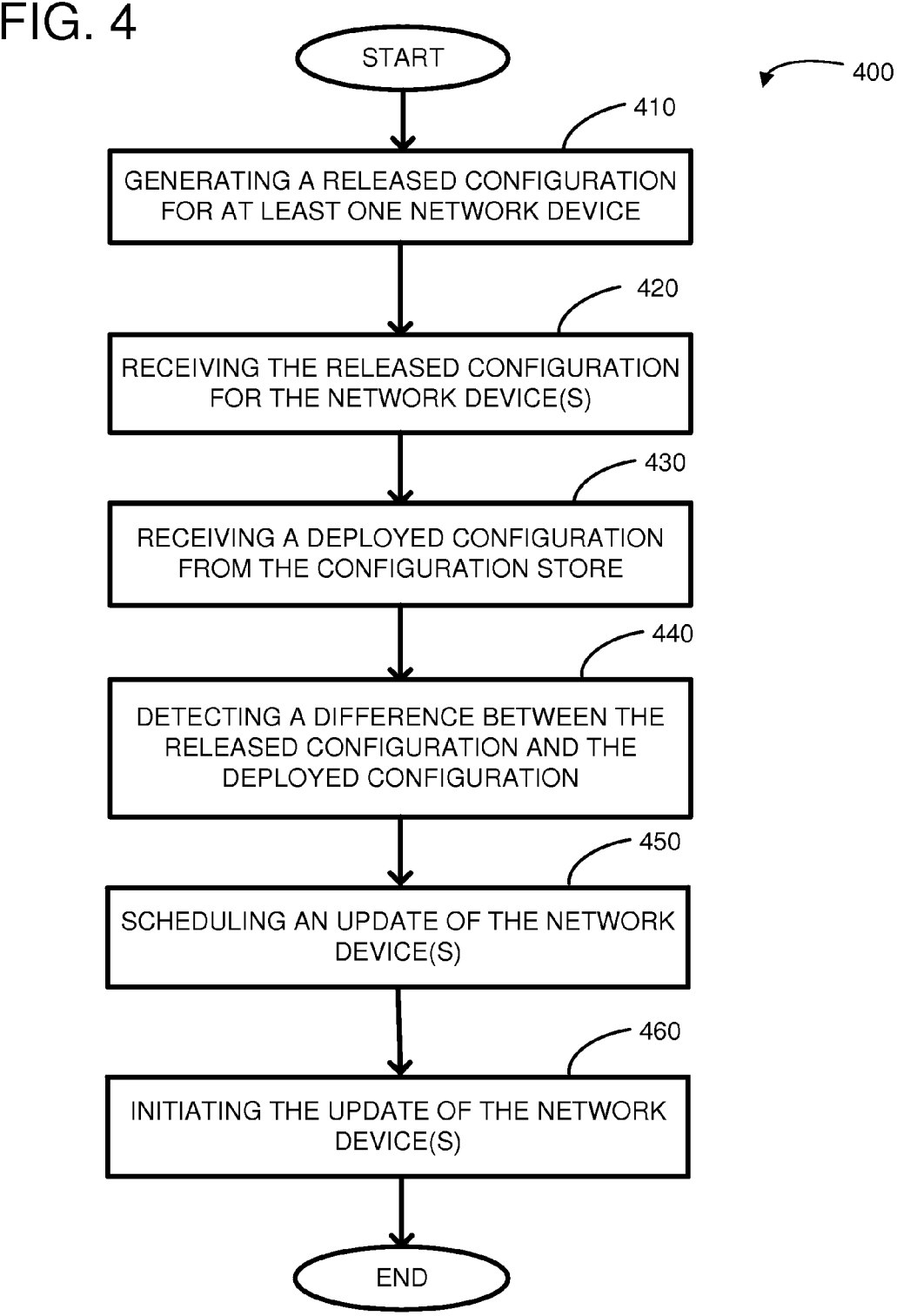
FIG. 4 is a flow diagram of an example method for initiating an update of a network device.

FIG. 4 is a flow diagram of an example method 400 for initiating an update of network devices, such as one or more of the network devices 130. At 410, a released configuration can be generated for at least one network device, such as one or more of the network devices 130. The released configuration can represent an authoritative next-provisioned state of the network device. For example, the builders 310 can generate a released configuration in response to a subset of the configuration information being updated in data sources 315. The released configuration can be communicated from the builders 310 to the configuration store 320. As another example, a released configuration can be generated after a code-review approval process, such as by changing a status of the configuration from "under-review" to "released."

At 420, the released configuration for the network device(s) can be received. For example, a generated configuration can be communicated to a configuration service by the builders 310. As another example, the released configuration can be received when the configuration is accepted as the authoritative configuration, such as when a status of the configuration is changed to "released." The configuration service can store the configuration in the configuration store 320 as the released configuration.

At 430, a deployed configuration can be received from the configuration store 320. For example, the deployed configuration can be copied from the released configuration. As another example, the configuration state of a newly updated network device can be collected by the collector service 330 and stored in the configuration store 320 as the deployed configuration. For example, the collector service 330 can remotely login to the network device, execute a "show run" on the network device, and capture the output of the command (such as by piping the output to a log file). The collected configuration can be stored in the configuration store 320 as the deployed configuration as a backend step of the network device update. Additionally, configuration state from the network devices 130 can be stored as a collected configuration when the configuration state is collected at times other than during an update of the network devices 130.

At 440, a difference between the released configuration and the deployed configuration can be detected. For example, the auditor service 340 can perform a comparison between the released configuration and the deployed configuration to determine if there is a difference between them. Performing the comparison can include generating canonical configurations for the released configuration and the deployed configuration and comparing the canonical configurations. A complete canonical configuration is a representation of all of the configuration state of the network device presented in a uniform way (such as ordering and formatting) without duplicative state. When doing the comparison between the released configuration and the deployed configuration, some parts of the configuration can be filtered or masked. In particular, a portion of the configuration can be excluded from the comparison between the released configuration and the deployed configuration. For example, when a portion of the configuration includes data that does not affect the operation of the network device it may be desirable to exclude this information from the comparison. As a specific example, the deployed configuration may include data that is hardware- or topology-specific, but does not affect the operation of the network device. However, configuration data that affects the operation of the network device can be included in the comparison.

The differences may occur on multiple network devices, such as when a new released configuration is generated for a type of device, and there are multiple devices of that type in the network. For example, a redundancy group (e.g., a Clos network) may include multiple identical devices (e.g., routers) having portions of their configurations that are the same. Detecting differences on the network devices can include determining which network devices have a difference between the released configuration and the deployed configuration. Those devices where differences are detected can be the set of network devices to be configured.

At 450, an update of the network device(s) can be scheduled. For example, the update can be scheduled by the scheduler service 110 when a difference between the released configuration and the deployed configuration is detected. The beginning of the update can be scheduled based on one more policies, rules, events, or other suitable criteria defined in the configuration rules. For example, the update can begin at a specific time, within a window of time, when a measured performance criteria is satisfied, or when some other event within the network occurs. The schedule for individual network devices can be based on the network topology and the configuration rules. For example, the set of network devices to be configured can be mapped into one or more redundancy groups within the network topology. The configuration of individual network devices can be scheduled according to the configuration rules and the mapping of the set of network devices so that network traffic is capable of flowing through the network during the configuration of the network devices.

At 460, the update of the network device(s) can be initiated upon the scheduled event occurring. For example, the scheduler service 110 or another service can monitor the criteria of scheduled events, and when the criteria for the scheduled event is satisfied, the scheduler service 110 can initiate the update of the network device(s). The update can be initiated by calling or executing one or more of the configuration tools 120 and/or the tasks of the deployment fleet 350. As a result of the update, the released configuration can be loaded or installed on one or more of the network devices 130, and the post-installation configuration state can be collected from the network device and stored at the configuration store 320.

The scheduler service 110 can coordinate multiple jobs performed by the configuration tools 120 and/or the tasks of the deployment fleet 350. For example, the scheduler service 110 can initiate multiple jobs in parallel, wait for those jobs to complete, test that the jobs completed correctly (e.g., perform post-checks), and start a new set of jobs when the dependencies to start the jobs are satisfied. The scheduler service 110 can continue to initiate new jobs until the entire set of network devices to be configured have been configured, or until an error occurs and the update is aborted.

Figure 5:
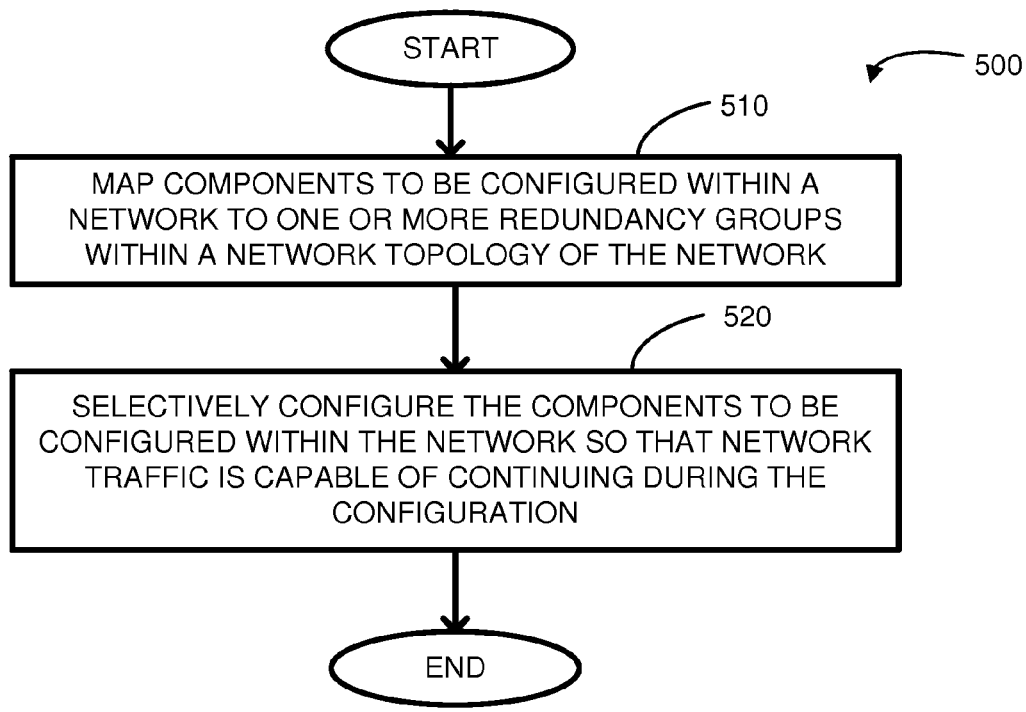
FIGS. 5-6 are flow diagrams of example methods for configuring devices of a network.

FIG. 5 is a flow diagram of an example method 500 for configuring components of a network, such as the interconnection network 130. At 510, the components to be configured within a network can be mapped to one or more redundancy groups within a network topology of the network. The components can also be mapped to a redundant path of a redundancy group. The components to be configured can be selected based on detecting a difference between a released configuration and a deployed configuration.

At 520, the components to be configured within the network can be selectively configured so that network traffic is capable of continuing during the configuration. Selectively configuring the components can include choosing an order to configure the components based on configuration rules and the mapping of the components to the one or more redundancy groups. Selectively configuring the components can include validating whether earlier configured components were configured properly, and aborting the configuration of subsequently scheduled components when earlier configured components are not configured properly.

Figure 6:
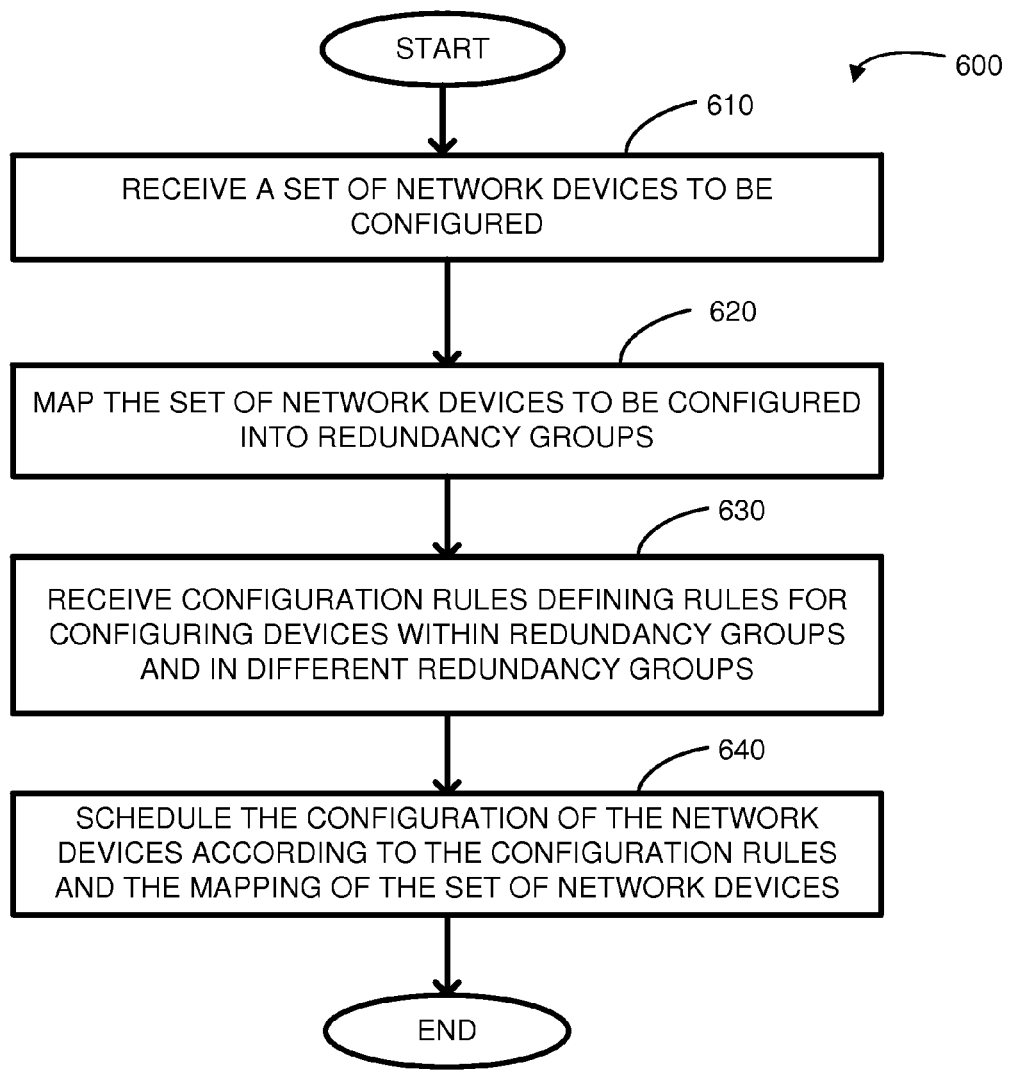

FIG. 6 is a flow diagram of an example method 600 for configuring network devices of a network, such as the interconnection network 130. At 610, a set of network devices to be configured can be received. The set of network devices can be selected from a plurality of network devices of the network, where the network is arranged according to a network topology. The respective devices of the set of the network devices can be identified by a physical device, a logical device, and/or a device type.

At 620, the set of network devices to be configured can be mapped into one or more redundancy groups within the network topology. The set of network devices to be configured can be mapped into redundant paths of the one or more redundancy groups.

At 630, extensible configuration rules can be received. The configuration rules can define rules for configuring devices within redundancy groups and in different redundancy groups. The configuration rules can define rules for when to begin updating the network devices. For example, the update can begin at the beginning of a window of time or when performance criteria of the network are met.

At 640, the configuration of the network devices can be scheduled according to the configuration rules and the mapping of the set of network devices so that network traffic is capable of flowing through the network during the configuration of the network devices. Scheduling the configuration of the network devices can include creating a time or set of conditions to begin configuring the network devices, creating an order to configure the respective network devices, and sequencing the configuration of the network devices by following the created ordering. The scheduled order can be stopped or aborted if an error in the configuration of any network device is detected. For example, a configuration of a network device of a first redundant path of a particular redundancy group can be checked to determine whether the network device is validly configured. When the configuration of the network device of the first redundant path is not validly configured, the configuration of a network device of a second redundant path of the particular redundancy group can be aborted.

Figure 7:
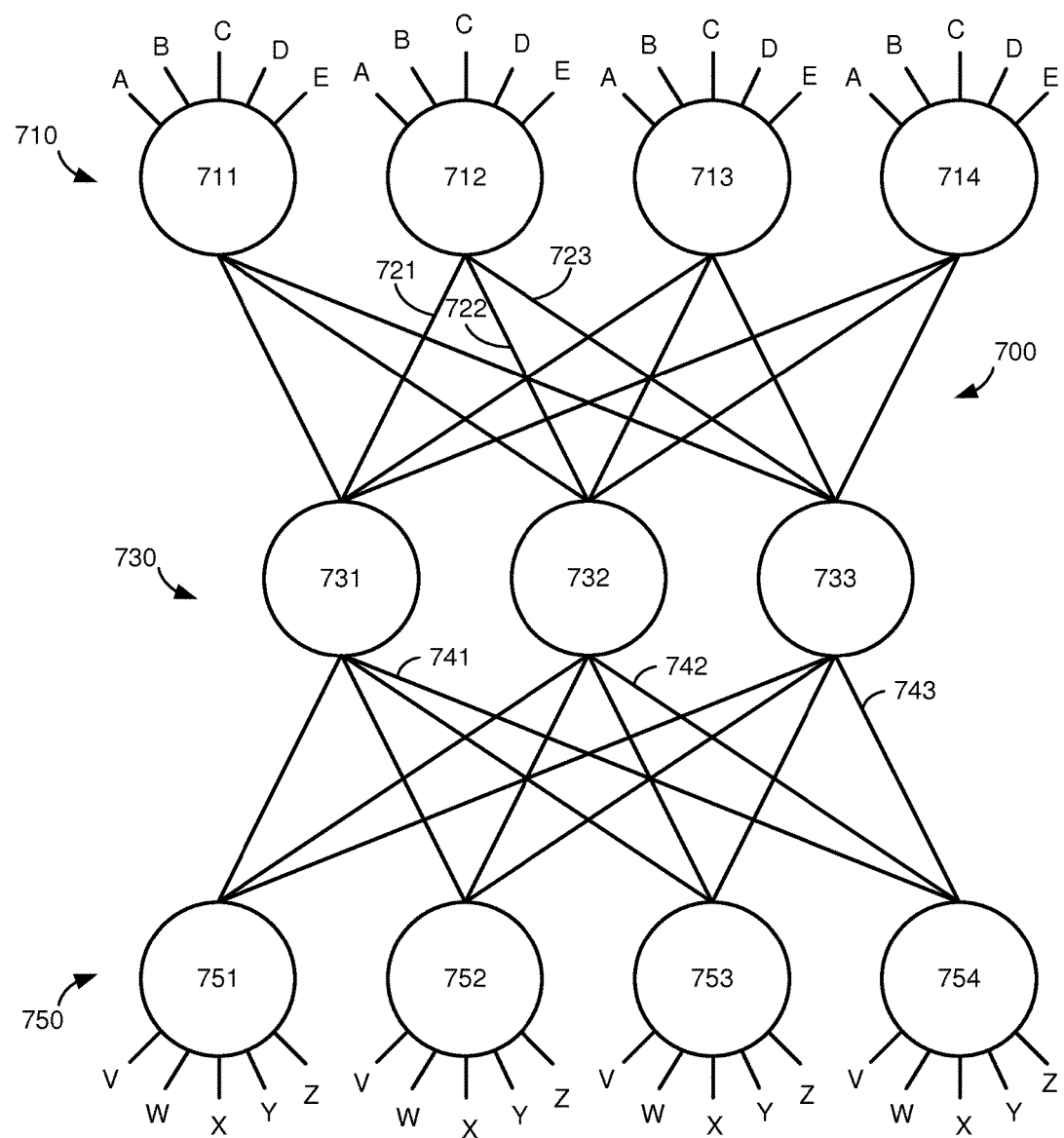
FIG. 7 is a system diagram showing an example network.

FIG. 7 is a system diagram showing an example network 700, arranged according to a network topology. Specifically, the network topology is a high-radix network including three tiers (710, 730, and 750) of nodes (e.g., routers or switches). The network topology can be divided into at least three redundancy groups, one for each tier of nodes. Each of the redundancy groups includes a number of redundant paths equal to the number of nodes in the tier. Specifically, the respective nodes 711-714 of the tier 710 are each connected to end-nodes A-E and to the nodes 731-733 of the tier 730. Thus, there are four redundant paths to get from any of the end-nodes A-E and to any of the nodes 731-733 of the tier 730. The respective nodes 731-733 of the tier 730 are each connected to the nodes 711-714 of the tier 710 and to the nodes 751-754 of the tier 750. Thus, there are three redundant paths to get from any of the nodes 711-714 of the tier 710 and to any of the nodes 751-754 of the tier 750. The respective nodes 751-754 of the tier 750 are each connected to end-nodes V-Z and to the nodes 731-733 of the tier 730. Thus, there are four redundant paths to get from any of the end-nodes V-Z and to any of the nodes 731-733 of the tier 730.

Additionally or alternatively, a redundancy group can correspond to the entire high-radix network since there are multiple redundant paths between the end-nodes A-E and the end-nodes V-Z. The redundancy group corresponding to the high-radix network can be flat, having a single layer of hierarchy, or it can be hierarchical, where redundancy groups within the hierarchy correspond to each of the tiers (710, 730, and 750).

The network 700 can be configured in a topologically aware manner. A set of nodes of the network to be configured can be determined. For example, all of the nodes can be configured, such as when the nodes are identical and a new released configuration is generated for a device type of the nodes. The nodes can be mapped to one or more redundancy groups within the network topology of the network 700. For example, node 712 can be mapped to redundancy groups corresponding to the tier 710 and the network 700. As another example, node 753 can be mapped to redundancy groups corresponding to the tier 750 and the network 700.

Configuration rules can define rules for configuring devices within redundancy groups and in different redundancy groups. For example, the configuration rules can allow devices to be configured in multiple tiers of the high-radix network at one time. Alternatively, the configuration rules can allow only one tier to be updated at one time. As another example, the configuration rules can set a maximum number of devices (such as one or two or 20% of the devices within the redundancy group) to configure concurrently within a tier or a maximum bandwidth loss (such as 50%) allowed during the configuration of a tier. As another example, the configuration rules can set a start time to begin an update, such as at midnight.

The components to be configured within the network 700 can be selectively configured so that network traffic is capable of continuing during the configuration. For example, the configuration rules can allow a single device in a single tier to be configured at one time. Thus, the nodes can be configured one at a time until all of the nodes are updated. Network traffic can continue to flow through redundant paths during the configuration of any device. In particular, traffic can continue to flow from node 712 to node 754 when node 732 is being configured. The traffic that would have flowed through links 722 and 742 can be rerouted to go through the first redundant path that includes links 721 and 741 and node 731 or the second redundant path that includes links 723 and 743 and node 733.

As another example, the configuration rules can allow multiple tiers to be configured in parallel and multiple devices within a tier to be configured in parallel so long as the total available bandwidth is not reduced by more than 50%. Thus, two devices in the tier 710, two devices in the tier 750, and one device in the tier 730 can be configured concurrently, because configuring two of four devices reduces the bandwidth by 50% and configuring one of three devices reduces the bandwidth by 33%. The network traffic can be rerouted away from the devices being configured and to the redundant paths.

Selectively configuring the components can include validating whether earlier configured components were configured properly, and aborting the configuration of subsequently scheduled components when earlier configured components are not configured properly. For example, device 731 can be the first device configured in the tier 730 and devices 732 and 733 can be scheduled to follow the configuration of device 731. If device 731 is determined to have not been configured properly, the configuration of devices 732 and 733 can be aborted so that any potential errors are not propagated through the redundancy group.

Figure 8:
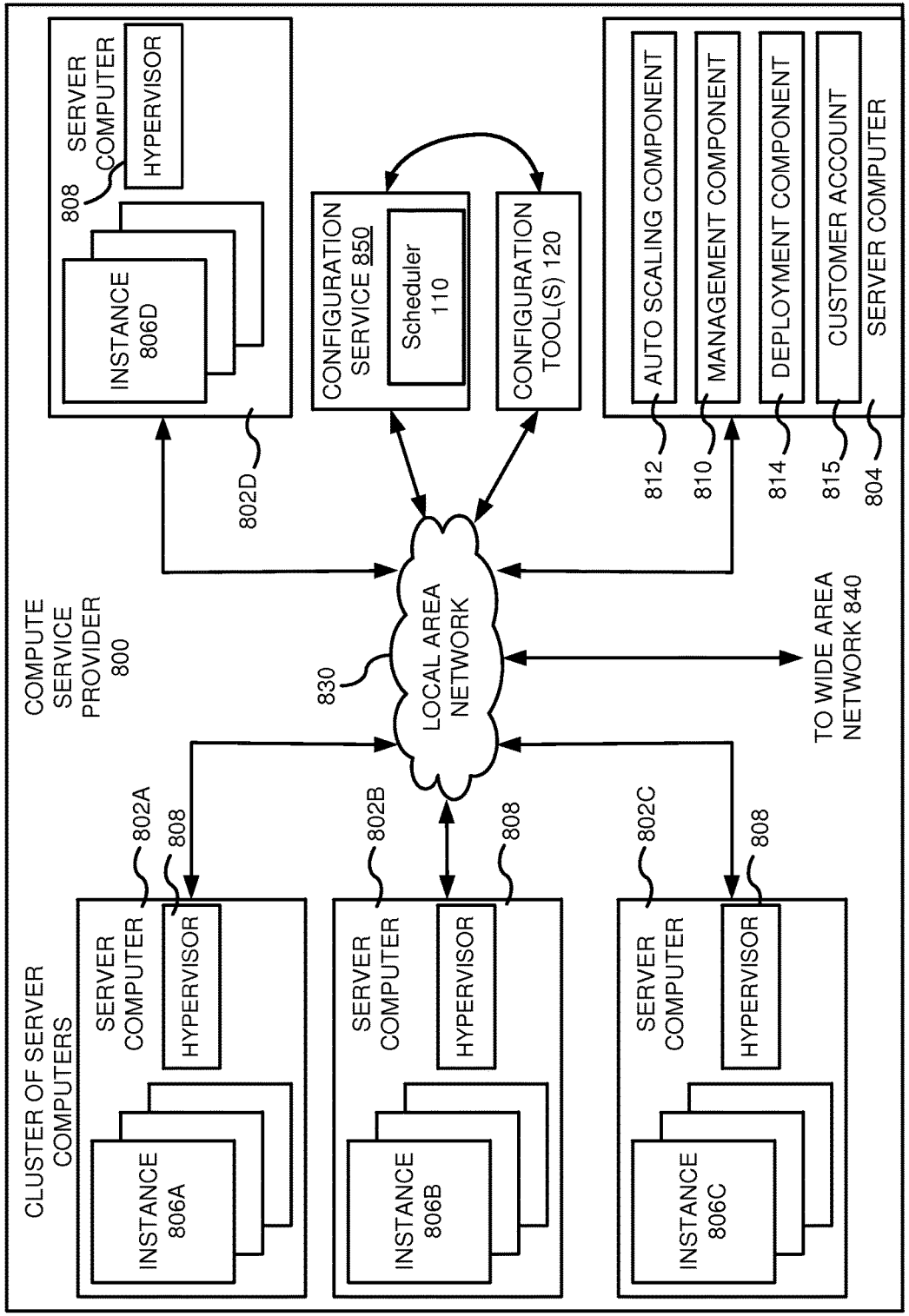
FIG. 8 is an example system diagram showing a plurality of virtual machine instances running in the multi-tenant environment.

FIG. 8 is a computing system diagram of a network-based compute service provider 800 that illustrates one environment in which embodiments described herein can be used. By way of background, the compute service provider 800 (i.e., the cloud provider) is capable of delivery of computing and storage capacity as a service to a community of end recipients. In an example embodiment, the compute service provider can be established for an organization by or on behalf of the organization. That is, the compute service provider 800 may offer a "private cloud environment." In another embodiment, the compute service provider 800 supports a multi-tenant environment, wherein a plurality of customers operate independently (i.e., a public cloud environment). Generally speaking, the compute service provider 800 can provide the following models: Infrastructure as a Service ("IaaS"), Platform as a Service ("PaaS"), and/or Software as a Service ("SaaS"). Other models can be provided. For the IaaS model, the compute service provider 800 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 800 using networked client devices, such as desktop computers, laptops, tablets, smartphones, etc. running web browsers or other lightweight client applications. Those skilled in the art will recognize that the compute service provider 800 can be described as a "cloud" environment.

The particular illustrated compute service provider 800 includes a plurality of server computers 802A-802D. While only four server computers are shown, any number can be used, and large centers can include thousands of server computers. The server computers 802A-802D can provide computing resources for executing software instances 806A-806D. In one embodiment, the instances 806A-806D are virtual machines. As known in the art, a virtual machine is an instance of a software implementation of a machine (i.e. a computer) that executes applications like a physical machine. In the example of virtual machine, each of the servers 802A-802D can be configured to execute a hypervisor 808 or another type of program configured to enable the execution of multiple instances 806 on a single server. Additionally, each of the instances 806 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 804 can be reserved for executing software components for managing the operation of the server computers 802 and the instances 806. For example, the server computer 804 can execute a management component 810. A customer can access the management component 810 to configure various aspects of the operation of the instances 806 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 812 can scale the instances 806 based upon rules defined by the customer. In one embodiment, the auto scaling component 812 allows a customer to specify scale-up rules for use in determining when new instances should be instantiated and scale-down rules for use in determining when existing instances should be terminated. The auto scaling component 812 can consist of a number of subcomponents executing on different server computers 802 or other computing devices. The auto scaling component 812 can monitor available computing resources over an internal management network and modify resources available based on need.

A deployment component 814 can be used to assist customers in the deployment of new instances 806 of computing resources. The deployment component can have access to account information associated with the instances, such as who is the owner of the account, credit card information, country of the owner, etc. The deployment component 814 can receive a configuration from a customer that includes data describing how new instances 806 should be configured. For example, the configuration can specify one or more applications to be installed in new instances 806, provide scripts and/or other types of code to be executed for configuring new instances 806, provide cache logic specifying how an application cache should be prepared, and other types of information. The deployment component 814 can utilize the customer-provided configuration and cache logic to configure, prime, and launch new instances 806. The configuration, cache logic, and other information may be specified by a customer using the management component 810 or by providing this information directly to the deployment component 814. The instance manager can be considered part of the deployment component.

Customer account information 815 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 830 can be utilized to interconnect the server computers 802A-802D and the server computer 804. The network 830 can be a local area network (LAN) and can be connected to a Wide Area Network (WAN) 840 so that end users can access the compute service provider 800. It should be appreciated that the network topology illustrated in FIG. 8 has been simplified and that many more networks and networking devices can be utilized to interconnect the various computing systems disclosed herein.

A network device configuration deployment pipeline can be used to deploy and/or update one or more network devices of the network 830. The network device configuration deployment pipeline can include a configuration service 850 and the configuration tools 120. The configuration service 850 can include a configuration store for storing multiple versions of device configurations, such as a released configuration and a deployed configuration. The configuration service 850 can include the scheduler 110 for scheduling the configuration of a set of network devices of a network. When a difference between the released configuration and the deployed configuration of any of the network devices is detected, the configuration service 850 can use the scheduler 110 to schedule and initiate an update of the network 830. For example, the scheduler 110 can include a mapping component adapted to map a set of network devices to be configured to one or more redundancy groups within a topology of the network. The scheduler 110 can include a sequencing component adapted to coordinate a configuration of the set of network devices according to configuration rules so that traffic is capable of flowing through the network during the configuration. The configuration rules can define rules for configuring network devices within redundancy groups and in different redundancy groups. The scheduler 110 can include a checking component adapted to determine if a redundant path of a particular redundancy group is properly configured and to abort configuration of the particular redundancy group when the redundant path is not properly configured. The sequencing component, in coordination with the checking component, can execute or call one or more of the configuration tools 120 to update one or more of the network devices of the network 830 according to the released configurations for the network devices. The network device configurations can be collected from the network 830 to confirm whether the network devices were configured properly and to maintain a record of the deployed state of the network devices.

Figure 9:
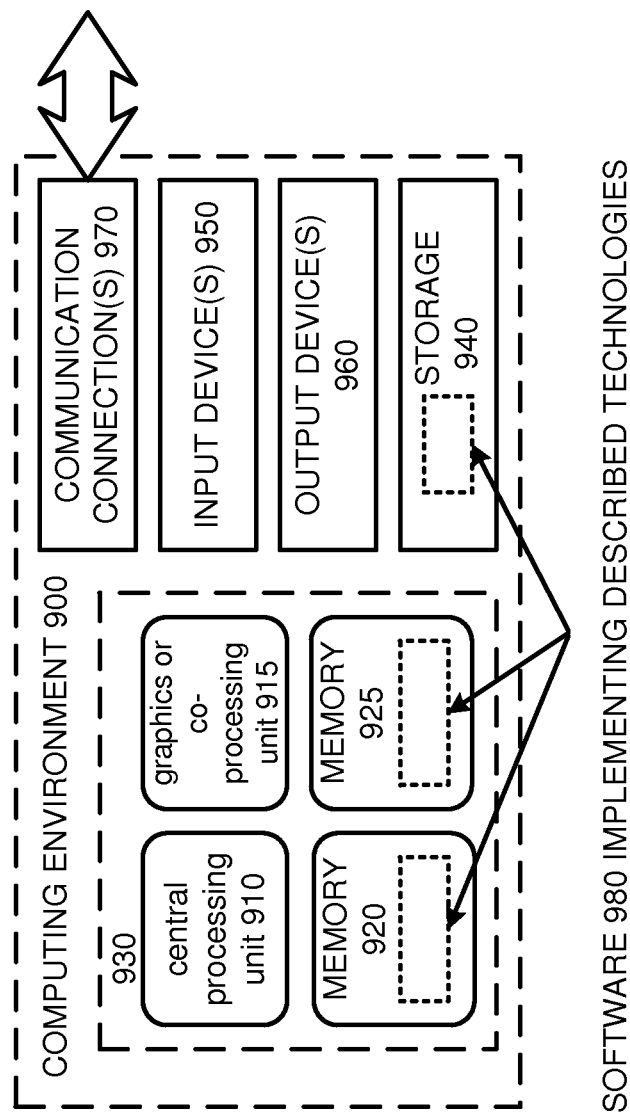
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose Central Processing Unit (CPU), processor in an Application-Specific Integrated Circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method for scheduling the configuration of a network, the method comprising:
   receiving a set of network devices to be configured, the set of network devices selected from a plurality of network devices of the network, the network arranged according to a network topology;
   mapping the set of network devices to be configured into a plurality of redundancy groups within the network topology, wherein a respective redundancy group includes a plurality of network devices and a plurality of redundant paths for routing traffic through the respective redundancy group;
   receiving extensible configuration rules for configuring devices within the respective redundancy group and in different redundancy groups, wherein the configuration rules define a maximum number of network devices that can be configured in parallel within the respective redundancy group; and
   scheduling the configuration of the set of network devices according to the configuration rules and the mapping of the set of network devices so that network traffic flows through the network during the configuration of the set of network devices.

2. The method of claim 1, further comprising:
  checking whether a configuration of a network device of a first redundant path of a particular redundancy group is validly configured; and
  aborting configuration of a network device of a second redundant path of the particular redundancy group when the configuration of the network device of the first redundant path is not validly configured.

3. The method of claim 2, wherein checking whether the configuration of the network device of the first redundant path of the particular redundancy group is validly configured comprises comparing a released configuration of the network device of the first redundant path to a deployed configuration of the network device of the first redundant path.

4. The method of claim 1, wherein scheduling the configuration of the set of network devices comprises serializing the configuration of different redundant paths within a particular redundancy group.

5. The method of claim 1, wherein the set of network devices to be configured includes different types of network devices.

6. A computer-readable storage medium including instructions that upon execution cause a computer system to:
  map network components to be configured within a network to a plurality of redundancy groups within a network topology of the network, wherein a respective redundancy group includes a plurality of network components and a plurality of redundant paths for carrying network traffic through the respective redundancy group; and
  selectively configure the network components to be configured within the network so that network traffic continues during the configuration, wherein selectively configuring the network components comprises choosing an order in which to configure the network components based on configuration rules and the mapping of the network components to the plurality of redundancy groups, the configuration rules comprising a rule specifying a maximum number of network components capable of being configured in parallel within a given redundancy group.

7. The computer-readable storage medium of claim 6, wherein selectively configuring the network components to be configured comprises determining whether a particular network component is configured properly.

8. The computer-readable storage medium of claim 7, wherein the configuration of subsequently scheduled network components is aborted when it is determined that the particular network component is not configured properly.

9. The computer-readable storage medium of claim 7, wherein determining whether a particular network component is configured properly comprises comparing neighborship before and after the network component is configured.

10. The computer-readable storage medium of claim 7, wherein determining whether a particular network component is configured properly comprises measuring a flow of traffic through the particular network component when traffic is routed through the particular network component.

11. The computer-readable storage medium of claim 6, wherein selectively configuring the network components to be configured comprises using at least one of a heterogeneous set of configuration tools to configure the network components.

12. The computer-readable storage medium of claim 6, wherein the configuration rules define rules for configuring network components that are mapped to different redundancy groups of the plurality of redundancy groups.

13. The computer-readable storage medium of claim 6, wherein choosing an order to configure the network components comprises providing a slow start wherein more network components are scheduled in parallel later in the schedule than earlier in the schedule.

14. The computer-readable storage medium of claim 6, wherein the instructions, upon execution, further cause the computer system to:
  receive the network topology of the network from a web service executing on the computer system.

15. A system for configuring a network, the system comprising:
  a mapping component adapted to map a set of network devices to be configured to a plurality of redundancy groups within a topology of the network, wherein a respective redundancy group includes a plurality of network devices and a plurality of redundant paths for carrying network traffic through the respective redundancy group;
  a sequencing component adapted to coordinate a configuration of the set of network devices according to configuration rules so that traffic flows through the network during the configuration, the configuration rules defining rules for configuring network devices within redundancy groups and in different redundancy groups, the configuration rules for configuring network devices within a respective redundancy group specifying a number of network devices capable of being configured in parallel within the respective redundancy group; and
  a checking component adapted to determine if a redundant path of a particular redundancy group is properly configured and to abort configuration of the particular redundancy group when the redundant path is not properly configured.

16. The system of claim 15, wherein the sequencing component is in communication with a heterogeneous set of configuration tools, and the sequencing component is adapted to use a plurality of the configuration tools during the configuration of the set of network devices.

17. The system of claim 15, wherein the checking component is adapted to compare a released configuration to a deployed configuration for respective configured network devices of the set of network devices.

18. The system of claim 15, wherein the sequencing component is adapted to cause traffic to be routed away from a particular network device before the particular network device is configured.

* * * * *